US012609439B2

(12) United States Patent
Cheng

(10) Patent No.: US 12,609,439 B2
(45) Date of Patent: Apr. 21, 2026

(54) ELECTRONIC DEVICE AND PIVOTABLE ASSEMBLY

(71) Applicant: GETAC HOLDINGS CORPORATION, Taoyuan City (TW)

(72) Inventor: Kuo-Heng Cheng, Taipei City (TW)

(73) Assignee: GETAC HOLDINGS CORPORATION, Taoyuan City (TW)

(*) Notice: Subject to any disclaimer, the term of this patent is extended or adjusted under 35 U.S.C. 154(b) by 0 days.

(21) Appl. No.: 18/203,513

(22) Filed: May 30, 2023

(65) Prior Publication Data

US 2023/0299464 A1 Sep. 21, 2023

Related U.S. Application Data

(62) Division of application No. 17/183,187, filed on Feb. 23, 2021, now Pat. No. 11,715,872.

(60) Provisional application No. 63/044,206, filed on Jun. 25, 2020.

(51) Int. Cl.

| | |
|---|---|
| ***H01Q 1/08*** | (2006.01) |
| ***H01Q 1/02*** | (2006.01) |
| ***H01Q 1/22*** | (2006.01) |
| ***H01Q 1/24*** | (2006.01) |
| ***H01Q 9/30*** | (2006.01) |
| ***H01Q 21/28*** | (2006.01) |

(52) U.S. Cl.

CPC ............... *H01Q 1/241* (2013.01); *H01Q 1/02* (2013.01); *H01Q 1/084* (2013.01); *H01Q 1/2258* (2013.01); *H01Q 1/243* (2013.01); *H01Q 9/30* (2013.01); *H01Q 21/28* (2013.01)

(58) Field of Classification Search

CPC .......... H01Q 1/241; H01Q 1/02; H01Q 1/084; H01Q 1/2258; H01Q 1/243; H01Q 9/30; H01Q 21/28

See application file for complete search history.

(56) References Cited

U.S. PATENT DOCUMENTS

| | | | | |
|---|---|---|---|---|
| 6,963,311 B1* | 11/2005 | Enns | H01Q 1/246 | 343/702 |
| 2005/0094376 A1* | 5/2005 | Montoya | H01Q 1/02 | 361/704 |
| 2007/0060214 A1* | 3/2007 | Sung | H01Q 1/084 | 455/575.1 |
| 2008/0165078 A1* | 7/2008 | Song | H01Q 1/2258 | 343/906 |
| 2009/0033571 A1 | 2/2009 | Wang | | |
| 2009/0131129 A1 | 5/2009 | Yamazaki et al. | | |
| 2009/0251372 A1 | 10/2009 | Degner et al. | | |
| 2010/0090926 A1* | 4/2010 | Li | H01Q 21/28 | 343/893 |

(Continued)

FOREIGN PATENT DOCUMENTS

| | | |
|---|---|---|
| CN | 101578733 A | 11/2009 |
| CN | 101697557 A | 4/2010 |

(Continued)

*Primary Examiner* — Dameon E Levi
*Assistant Examiner* — Yonchan J Kim
(74) *Attorney, Agent, or Firm* — Cooper Legal Group, LLC

(57) ABSTRACT

An electronic device includes a casing, a first antenna assembly, a second antenna assembly and a third antenna assembly. At least one of the first antenna assembly, the second antenna assembly and the third antenna assembly is rotatably disposed on the casing, and the rest are fixed on the casing.

8 Claims, 8 Drawing Sheets

(56) References Cited

U.S. PATENT DOCUMENTS

| | | | | |
|---|---|---|---|---|
| 2018/0034163 | A1* | 2/2018 | Gok | H01Q 21/064 |
| 2019/0393591 | A1 | 12/2019 | Spick et al. | |
| 2020/0076065 | A1* | 3/2020 | Zhou | H01Q 1/27 |
| 2021/0011469 | A1* | 1/2021 | Chen | G05D 1/0016 |
| 2021/0050664 | A1* | 2/2021 | Lin | H01Q 1/273 |

FOREIGN PATENT DOCUMENTS

| | | | | | |
|---|---|---|---|---|---|
| CN | 101728629 | A | | 6/2010 | |
| CN | 103197743 | A | | 7/2013 | |
| CN | 204407469 | U | * | 6/2015 | |
| CN | 106527595 | A | | 3/2017 | |
| DE | 102017101977 | A1 | | 8/2018 | |
| GB | 2477573 | A | * | 8/2011 | H01Q 3/06 |
| JP | 2010109590 | A | | 5/2010 | |
| JP | 2012216945 | A | | 11/2012 | |
| KR | 200421716 | Y1 | * | 7/2006 | |
| KR | 20100000579 | U | * | 1/2010 | H01Q 1/084 |
| KR | 101643927 | B1 | | 7/2016 | |
| TW | M327095 | U | | 2/2008 | |

* cited by examiner

ELECTRONIC DEVICE AND PIVOTABLE ASSEMBLY

CROSS-REFERENCE TO RELATED APPLICATIONS

This application is a divisional of U.S. patent application Ser. No. 17/183,187, filed Feb. 23, 2021, which claims priority from U.S. Patent Application Ser. No. 63/044,206, filed on Jun. 25, 2020. The entire disclosures of U.S. patent application Ser. No. 17/183,187 and U.S. Patent Application Ser. No. 63/044,206 which is hereby incorporated by reference.

BACKGROUND OF THE INVENTION

Field of the Invention

The present invention relates to an electronic device and a pivotable assembly, and more particularly to an electronic device having an antenna assembly and a pivotable assembly capable of adjusting the position of an antenna assembly.

Description of the Prior Art

With the development of communication technologies, the current up-to-date mobile communication technology has developed from the Fourth-Generation (4G) mobile communication technology to the Fifth-Generation (5G) mobile communication technology. 5G features a high data transmission rate, reduced latency, energy saving abilities, low costs, a high system capacity and large-scale device connectivity, and thus 5G in the future is inevitably the technology employed by electronic devices (for example, rugged laptop computers or gaming laptop computers).

With respect to a conventional laptop computer, a 4G antenna is disposed on a host part. Although a screen part of a laptop computer is located within a signal transmission/reception range of the 4G antenna, due to properties of a strong penetration ability of 4G signals and a wide signal transmission/reception range of 4G signals, the influence that the screen part of a laptop computer has on signal transmission/reception of the 4G antenna is minimal. However, due to properties of a weak penetration ability of 5G signals and a small signal transmission/reception range of 5G antenna, when a 5G antenna and a 4G antenna are disposed on a same position under the configuration of a current laptop computer, the screen part of the laptop computer blocks signals in a main signal transmission/reception direction of the 5G antenna, hence significantly degrading the signal transmission/reception efficiency of the 5G antenna. Therefore, researchers and developers of the pertinent field are currently trying to solve the foregoing issue.

SUMMARY OF THE INVENTION

The present invention provides an electronic device and a pivotable assembly for solving the issue of the prior art, in which a screen part of a conventional laptop computer blocks signals in a main signal transmission/reception direction of a 5G antenna.

An electronic device disclosed by one embodiment of the present invention includes a casing, a first antenna assembly, a second antenna assembly and a third antenna assembly. At least one of the first antenna assembly, the second antenna assembly and the third antenna assembly is rotatably disposed on the casing, and the rest are fixed at the casing.

A pivotable assembly disclosed by another embodiment of the present invention is for mounting an antenna assembly, and includes an assembly member, a rotating member and an antenna mounting plate. The rotating member is pivotally disposed at the assembly member, and is rotatable along an axis of rotation relative to the assembly member. The antenna mounting plate is disposed at the rotating member, and has a mounting surface that is back facing the rotating member and for mounting the antenna assembly. The axis of rotation is parallel to a normal line of the mounting surface of the antenna mounting plate.

According to the electronic device and the pivotable assembly disclosed by the embodiments above, an angle of a main signal transmission/reception surface of the antenna assembly is adjustable by means of the antenna assembly rotatable relative to the casing, so that it is ensured that no element blocking signals is present on the main signal transmission/reception surface of the antenna assembly, thus maintaining signal transmission/reception performance of the antenna assembly.

The description associated with the contents of the present invention given above and the description of the embodiments below are examples for explaining principles of the present invention, and provide further interpretations for the claims of the present invention.

DETAILED DESCRIPTION OF THE EMBODIMENTS

Figure 1:
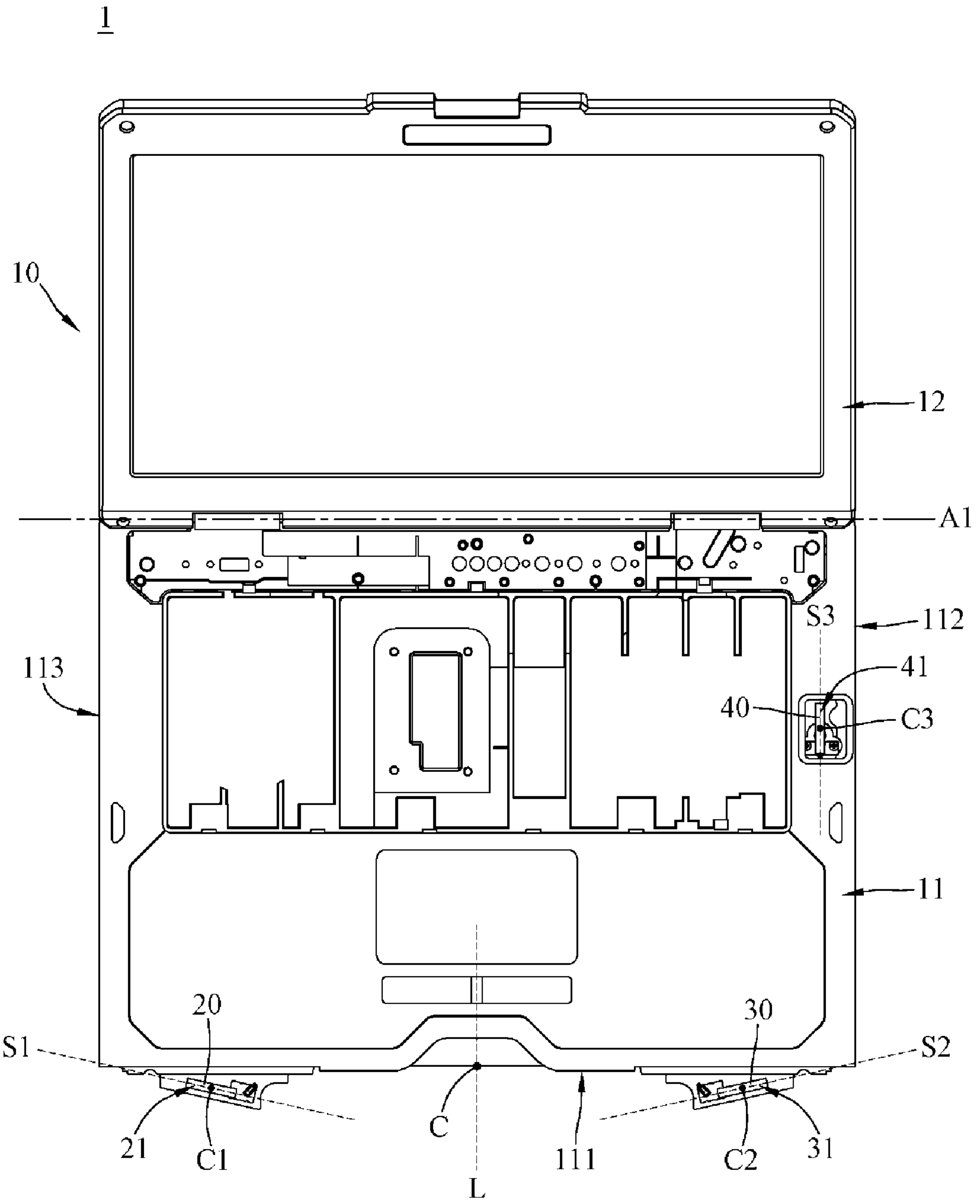
FIG. 1 is a top schematic diagram of an electronic device disclosed according to a first embodiment of the present invention.
Figure 2:
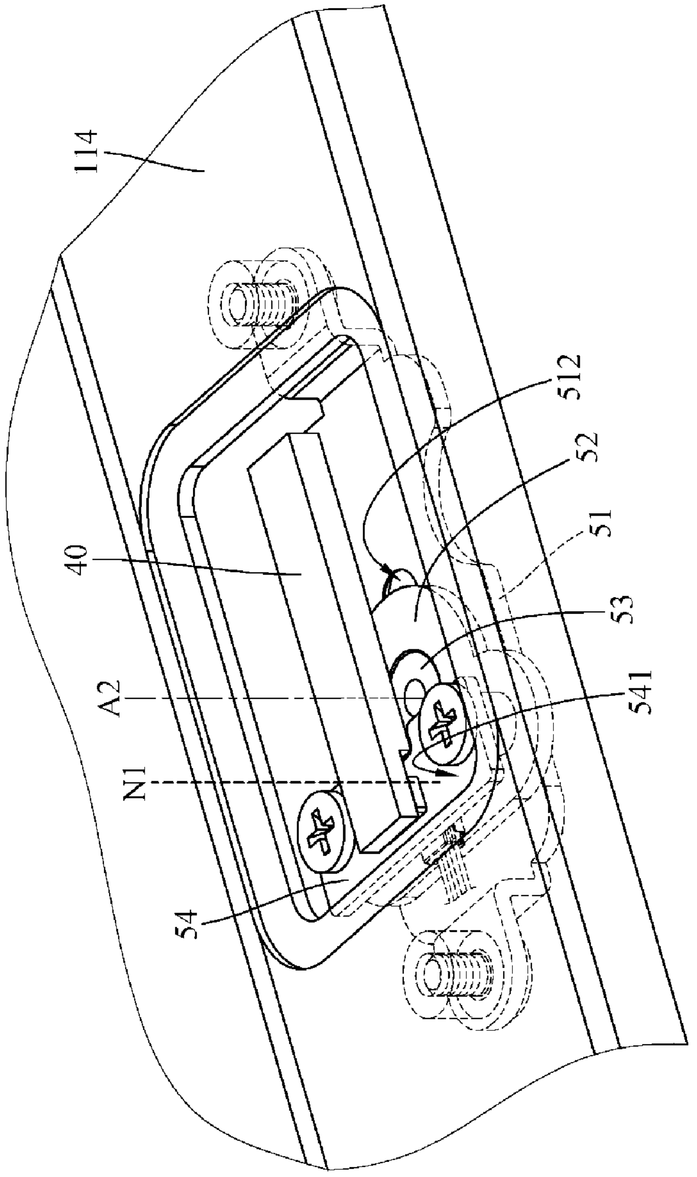
FIG. 2 is a partial three-dimensional schematic diagram of FIG. 1.
Figure 3:
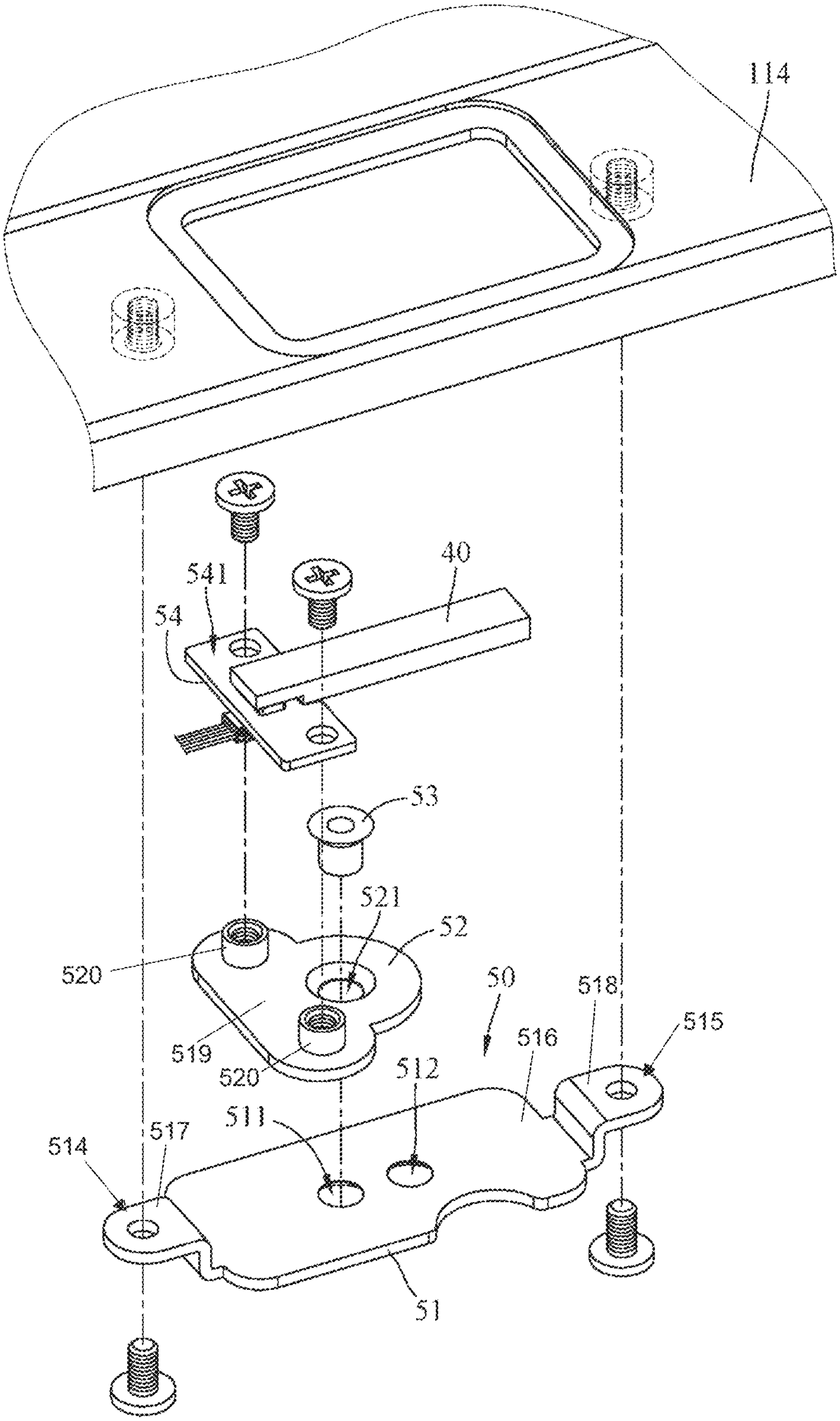
FIG. 3 is an exploded schematic diagram of a third antenna assembly and a pivotable assembly in FIG. 2.

Refer to FIG. 1 to FIG. 3. FIG. 1 shows a top schematic diagram of an electronic device disclosed according a first embodiment of the present invention. FIG. 2 is a partial three-dimensional schematic diagram of FIG. 1. FIG. 3 is an exploded schematic diagram of a third antenna assembly and a pivotable assembly in FIG. 2.

In this embodiment, an electronic device 1 is, for example, a rugged laptop computer or a gaming laptop computer. The electronic device 1 includes a casing 10, a first antenna assembly 20, a second antenna assembly 30 and a third antenna assembly 40. Further, in this embodiment or another embodiment, the electronic device 1 may further include a pivotable assembly 50.

The casing 10 includes a host 11 and a display 12. The display 12 is pivotally disposed at the host 11, and is rotatable around an axis of rotation A1 relative to the host 11.

The host 11 has a first side edge 111 and two second side edges 112 and 113. The first side edge 111 is located on one side of the host 11 away from the axis of rotation A1. The two second side edges 112 and 113 face each other, and are between the first side edge 111 and the axis of rotation A1.

The first antenna assembly 20, the second antenna assembly 30 and the third antenna assembly 40 are, for example, 5G antenna assemblies. The first antenna assembly 20, the second antenna assembly 30 and the third antenna assembly 40 are disposed, for example, in the host 11. Although the first antenna assembly 20 and the second antenna assembly 30 in FIG. 1 are exposed to the exterior, the first antenna assembly 20 and the second antenna assembly 30 are in fact covered by a housing of the host 11. In order to clearly depict the first antenna assembly 20 and the second antenna assembly 30, the part that covers the first antenna assembly 20 and the second antenna assembly 30 is omitted from FIG. 1. Two of the first antenna assembly 20, the second antenna assembly 30 and the third antenna assembly 40 are kept at different distances from the axis of rotation A1. More specifically, the first antenna assembly 20 and the second antenna assembly 30 are located on the first side edge 111 of the host 11, and the third antenna assembly 40 is located on the second side edge 112 of the host 11, with further details given below.

A center line L of the first side edge 111 of the host 11 passes through a center C of the first side edge 111 of the host 11, and is perpendicular to the axis of rotation A1. The first antenna assembly 20 and the second antenna assembly 30 are symmetrically configured relative to the center line L of the first side edge 111 of the host 11. The first antenna assembly 20 and the second antenna assembly 30 are fixed on an upper cover 114 of the host 11, and are not pivotally rotatable relative to the host 11. Thus, the third antenna assembly 40 is rotatable independent of the first antenna assembly 20 and the second antenna assembly 30.

The third antenna assembly 40 is pivotally located on the second side edge 112 of the host 11 by means of the pivotable assembly 50. It will be appreciated that since the first antenna assembly 20 and the second antenna assembly 30 are not pivotally rotatable relative to the host 11 and the third antenna assembly 40 is pivotally located on the second side edge 112 of the host 11, the third antenna assembly 40 is rotatable independent of the first antenna assembly 20 and the second antenna assembly 30.

In one embodiment, the third antenna assembly 40 is disposed on a position on a center line (not shown) between the first side edge 111 and the axis of rotation A1. In one embodiment, the third antenna assembly 40 is disposed on a position near the axis of rotation A1 and between the first side edge 111 and the axis of rotation A1, thereby reducing mutual influences of the first antenna assembly 20, the second antenna assembly 30 and the third antenna assembly 40 and increasing the signal transmission/reception range. More specifically, the pivotable assembly 50 includes an assembly member 51, a rotating member 52, a pivotal member 53 and an antenna mounting plate 54. The assembly member 51 is fixed at the host 11 by, for example, a screw, and is fixed on, for example, the upper cover 114 of the host 11. The assembly member 51 has two first pivotal holes 511 and 512, and the first pivotal holes 511 and 512 are kept at different distances from one of the sides of the assembly member 51. In other words, when the assembly member 51 is fixed on the second side edge 112 of the host 11, the first pivotal hole 512 is closer to the axis of rotation A1 than the first pivotal hole 511. The rotating member 52 has a second pivotal hole 521. The pivotal member 53 is, for example, a rivet. The pivotal member 53 passes through the first pivotal hole 511 and the second pivotal hole 521, such that the rotating member 52 can be pivotally connected to the first pivotal hole 511 through the pivotal member 53, allowing the rotating member 52 to be rotatable by an axis of rotation A2 relative to the assembly member 51. The antenna mounting plate 54 is disposed at the rotating member 52 by means of such as locking. The antenna mounting plate 54 has a mounting surface 541, which is back facing the rotating member 52, and the axis of rotation A2 is parallel to a normal line N1 of the mounting surface 541 of the antenna mounting plate 54. The third antenna assembly 40 is mounted on the mounting surface 541 of the antenna mounting plate 54. The antenna mounting plate 54 further includes a power connector 542, which is for coupling with a power line (not shown) in order to provide power needed by the third antenna assembly 40.

In this embodiment, each of the first antenna assembly 20, the second antenna assembly 30 and the third antenna assembly 40 includes a main signal transmission/reception surface, and all main signal transmission/reception regions of the first antenna assembly 20, the second antenna assembly 30 and the third antenna assembly 40 are located on the main signal transmission/reception surfaces.

Figure 4:
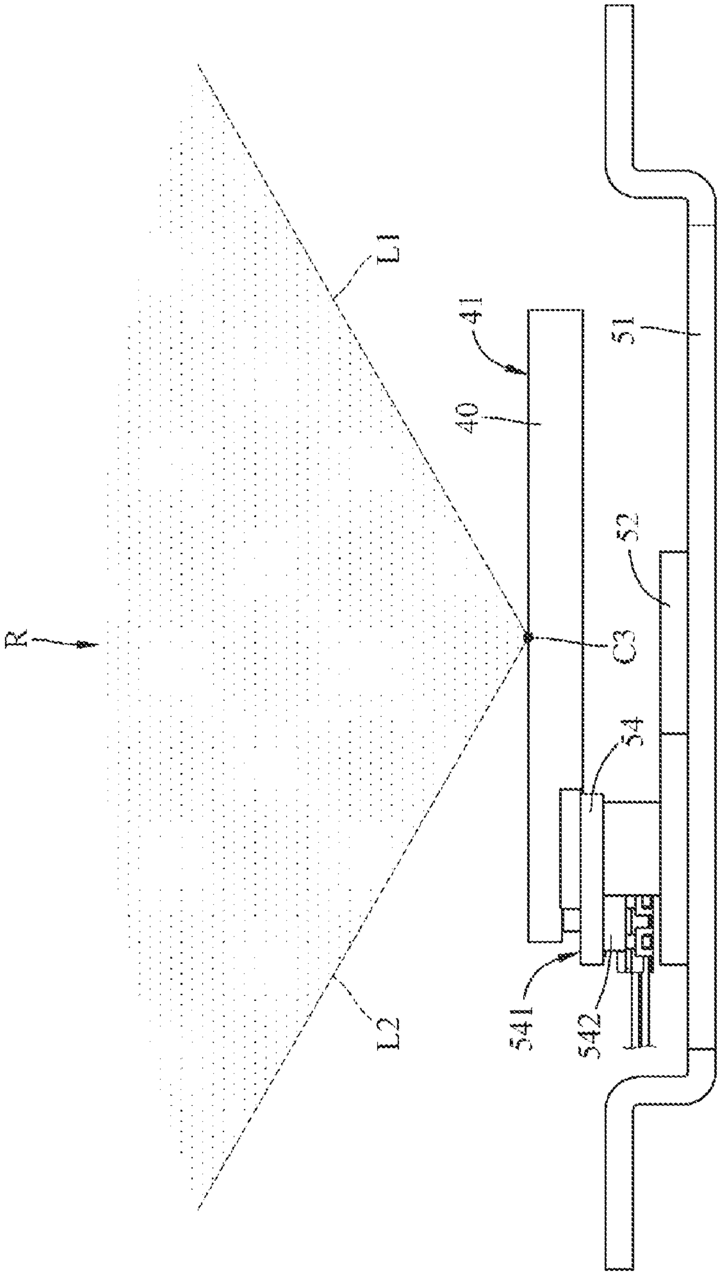
FIG. 4 is a side schematic diagram of a host and a third antenna assembly in FIG. 1.

Take the third antenna assembly 40 for example. Refer to FIG. 1 as well as FIG. 4. FIG. 4 shows a side schematic diagram of a host and a third antenna assembly in FIG. 1. A main signal transmission/reception surface S3 of the third antenna assembly 40 is perpendicular to an upper surface 41 of the third antenna assembly 40 back facing the rotating member 52, and a center C3 of the upper surface 41 of the third antenna assembly 40 is located on the main signal transmission/reception surface S3. A main signal transmission/reception region R of the third antenna assembly 40 is between border lines L1 and L2 of the upper surface 41, wherein the border lines L1 and L2 extend outward from the center C3 and have an included angle of 120 degrees. Similarly, main signal transmission/reception surfaces S1 and S2 of the first antenna assembly 20 and the second antenna assembly 30 are perpendicular to upper surfaces 21 and 31 thereof, respectively, the centers C1 and C2 of the upper surfaces 21 and 31 of the first antenna assembly 20 and the second antenna assembly 30 are similarly located on main signal transmission/reception surfaces S1 and S2 of the first antenna assembly 20 and the second antenna assembly 30, respectively. The main signal transmission/reception regions of the first antenna assembly 20 and the second antenna assembly 30 are similar to the main signal transmission/reception region R shown in FIG. 4, and associated description and drawings are omitted herein.

Referring to FIG. 3 and FIG. 4, the assembly member 51 comprises a first flange 514 and a second flange 515 disposed at opposite ends of the assembly member 51. A surface 516 of the assembly member 51 extends between the first flange 514 and the second flange 515 and is recessed relative to an upper surface 517 of the first flange 514 and an upper surface 518 of the second flange 515 facing the third antenna assembly 40. The rotating member 52 is disposed on the surface 516 extending between the first flange 514 and the second flange 515 such that an upper surface 519 of the rotating member 52 facing the third antenna assembly 40 is vertically below the upper surface 517 of the first flange 514 and the upper surface 518 of the second flange 515.

Referring to FIG. 3, the rotating member 52 comprises a plurality of protrusions 520 extending from the upper surface 519 of the rotating member 52 to suspend the antenna mounting plate 54 over the upper surface 519 of the rotating member 52. In some embodiments, the plurality of protrusions 520 comprise threads, and the antenna mounting plate 54 is connected to the rotating member 52 by the plurality of protrusions 520.

In this embodiment, the first antenna assembly 20 and the second antenna assembly 30 are located on the first side edge 111 of the host 11, each of the main signal transmission/reception surfaces S1 and S2 is kept at an acute angle from the axis of rotation A1, and the main signal transmission/reception surfaces S1 and S2 of the first antenna assembly 20 and the second antenna assembly 30 do not pass through the display 12. Thus, signals in the main signal transmission/reception regions of the first antenna assembly 20 and the second antenna assembly 30 are not blocked by the display 12.

From the perspective of FIG. 1, the main signal transmission/reception surface S3 of the third antenna assembly 40 is perpendicular to the axis of rotation A1. As a result, it is possible that signals in the main signal transmission/reception region R of the third antenna assembly 40 may be blocked by the display 12, such that the signal transmission/reception efficiency of the third antenna assembly 40 is undesirably affected. To prevent such situation, the rotating member 52 can be rotated to have the main signal transmission/reception surface S3 of the third antenna assembly 40 be non-perpendicular to the axis of rotation A1.

Figure 5:
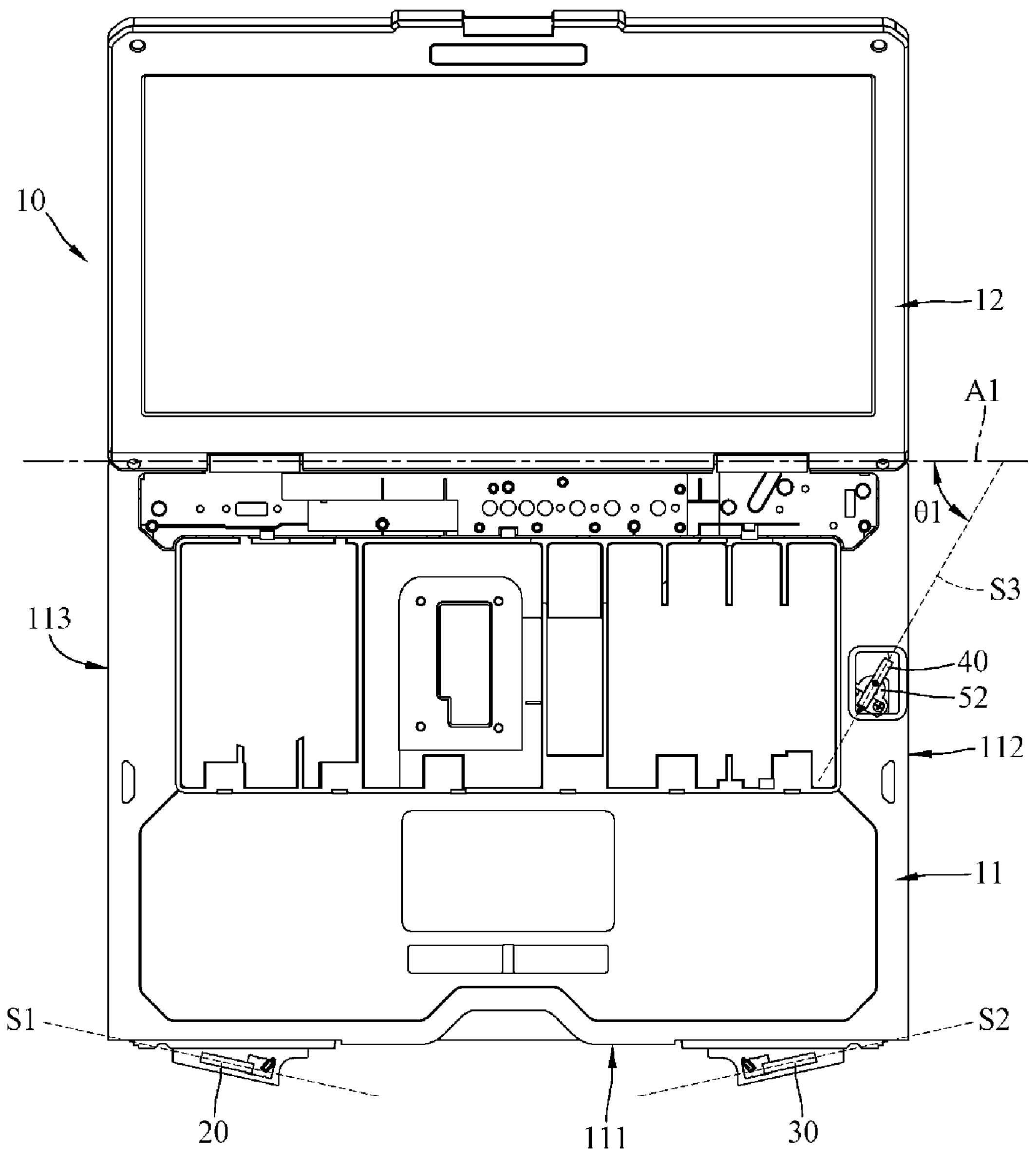
FIG. 5 is a top schematic diagram of a rotated third antenna assembly in FIG. 1.

More specifically, refer to FIG. 5. FIG. 5 shows a top schematic diagram of a rotated third antenna assembly in FIG. 1. Once the third antenna assembly 40 is rotated along with the rotating member 52, the main signal transmission/reception surface S3 of the third antenna assembly 40 is at an included acute angle θ1 relative to the axis of rotation A1, such that the main signal transmission/reception surface S3 of the third antenna assembly 40 does not pass through the display 12. Thus, the display 12 does not generate any blocking influence on the signals in the main signal transmission/reception region R (as shown in FIG. 4) of the third antenna assembly 40, hence maintaining the signal transmission/reception efficiency of the third antenna assembly 40. As such, the angle of the main signal transmission/reception surface S3 of the third antenna assembly 40 can be optimized according to the model and hardware specifications of the electronic device 1, allowing the first antenna assembly 20, the second antenna assembly 30 and the third antenna assembly 40 to cooperatively cover a most ideal signal transmission/reception range. In one embodiment, the value of the acute angle θ1 can be in a range between 0 degree and 90 degrees. In one embodiment, the value of the acute angle θ1 can be in a range between 10 degree and 80 degrees. In one embodiment, the value of the acute angle θ1 can be in a range between 15 degree and 75 degrees. In one embodiment, the value of the acute angle θ1 can be in a range between 30 degree and 60 degrees. In one embodiment, the value of the acute angle θ1 can be in a range between 35 degree and 45 degrees. In one embodiment, acute angles of the first antenna assembly 20 and the second antenna assembly 30 relative to the axis of rotation A1 can also be selected from the range of the acute angle θ1, respectively.

In this embodiment, the operation of adjusting the angle of the main signal transmission/reception surface S3 of the third antenna assembly 40 by means of the rotating member 52 is before shipping out of the factory, for the purpose of allowing the first antenna assembly 20, the second antenna assembly 30 and the third antenna assembly 40 to cooperatively cover the most ideal signal transmission/reception range. Once the angle of the main signal transmission/reception surface S3 of the third antenna assembly 40 is optimized, the strength of the pivotal member 53 (rivet) can be reinforced to prohibit the rotating member 52 from rotating relative to the assembly member 51, so as to maintain the angle of the main signal transmission/reception surface S3 of the third antenna assembly 40, hence maintaining the most ideal signal transmission/reception range. As such, the signal transmission/reception efficiency of antennas of the electronic device 1 shipped to a user is optimal.

In the present invention, when the angle of the main signal transmission/reception surface S3 of the third antenna assembly 40 has been optimized, whether or not the rotating member 52 is prohibited from rotating relative to the assembly member 51 is not limited. In other embodiments, when the angle of the main signal transmission/reception surface S3 of the third antenna assembly 40 has been optimized, the rotating member can still rotate relative to the assembly member, and the rotating member can be rotated by a manual or electrical means. When the rotating member is in an electrical configuration, the rotating member can be rotated by means of such as wireless control.

In this embodiment, the second side edge 113 of the host 11 is, for example but not limited, not provided with any antenna assembly. In other embodiments, the electronic device can further include another third antenna assembly 40 and another pivotable assembly 50; this third antenna assembly 40 can be rotatably disposed on the second side edge 113 of the host 11 by means of the pivotable assembly 50 in order to cover a more ideal transmission/reception range. Under such configuration, if the first pivotal hole 512 is still kept closer to the axis of rotation A1 than the first pivotal hole 511 after the assembly member 51 of the pivotable assembly 50 is installed to the host 11, the rotating member 52 is still pivotally disposed at the assembly member 51 through the first pivotal hole 511. On the other hand, if the first pivotal hole 511 is kept closer to the axis of rotation A1 than the first pivotal hole 512 after the assembly member 51 of the pivotable assembly 50 is installed to the host 11, the rotating member 52 is pivotally disposed at the assembly member 51 through the first pivotal hole 512. It is known that, the rotating member 52 can selectively be pivotally connected by different first pivotal holes 511 and 512, and can thus rotate by different axes of rotation relative to the assembly member 51. In one embodiment, the third antenna assembly 40 is capable of quickly adjusting an antenna to any direction by means of the rotating design to achieve an ideal coverage, further achieving designed effects within a fastest time by a least number of antennas. In this embodiment, the third antenna assembly 40 is rotatable in the host 11 through the pivotable assembly 50. In this embodiment, as shown in FIG. 1, the third antenna assembly 40 is rotatable by regarding a normal direction of a plane where the host 11 is located as an axis.

In this embodiment, the number of first pivotal holes 511 and 512 of the assembly member 51 is not limited to two. In other embodiments, the assembly member can have more pivotal holes or merely has one first pivotal hole.

In this embodiment, for example but not limited to, the antenna assembly on the first side edge 111 of the host 11 is non-rotatable, and the antenna assembly located on the second side edge 112 of the host 11 is rotatable. In other embodiments, the two antenna assemblies located on the first side edge 111 of the host 11 can be configured as being rotatable, and the antenna located on the second side edge 112 of the host 11 can be configured as being non-rotatable. Alternatively, one of the two antenna assemblies located on the first side edge 111 of the host 11 is configured as being rotatable, the other of the two antenna assemblies located on the first side edge 111 of the host 11 is configured as being non-rotatable, and the antenna located on the second side edge 112 of the host 11 is configured as being rotatable or non-rotatable.

Further, the numbers of the antenna assemblies located on the first side edge 111 and the second side edge 112 of the host 11 are not to be construed as limitations of the present invention. In other embodiments, only one antenna assembly can be provided on the first side edge 111 of the host 11, and multiple antenna assemblies can be provided on the second side edge 112 of the host 11.

Figure 6:
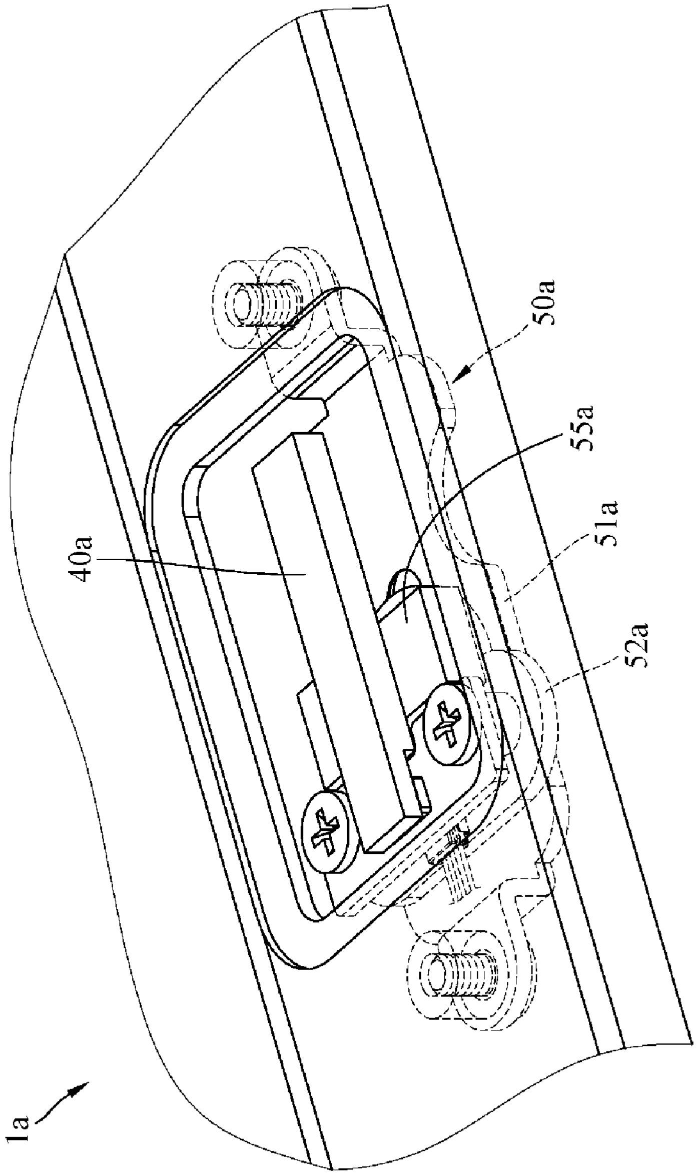
FIG. 6 is a partial three-dimensional schematic diagram of an electronic device disclosed according to a second embodiment of the present invention.

Next, refer to FIG. 6. FIG. 6 shows a partial three-dimensional schematic diagram of an electronic device disclosed according to a second embodiment of the present invention.

In this embodiment, an electronic device 1*a* is similar to the electronic device 1 in FIG. 1. Only differences between the two are described below, and details of the same or similar parts are omitted herein.

In this embodiment, an assembly member 51*a* and a rotating member 52*a* of a pivotable assembly 50*a* are of a heat conductive material, and the pivotable assembly 50*a* further includes a heat dissipating member 55*a*. The heat dissipating member 55*a* is stacked on the rotating member 52*a* and is disposed between a third antenna assembly 40*a* and the rotating member 52*a*, and the third antenna assembly 40*a* is thermally coupled to the rotating member 52*a* through the heat dissipating member 55*a*. As such, heat generated by the third antenna assembly 40*a* can be transferred to the rotating member 52*a* and the assembly member 51*a* to help heat dissipation.

In this embodiment, with the heat dissipating member 55*a* stacked on the rotating member 52*a*, when the rotating member 52*a* is rotated to adjust the angle of the third antenna assembly 40*a*, the heat dissipating member 55*a* is driven to rotate simultaneously, so as to maintain heat dissipation effects of the heat dissipating member 55*a*.

Figure 7:
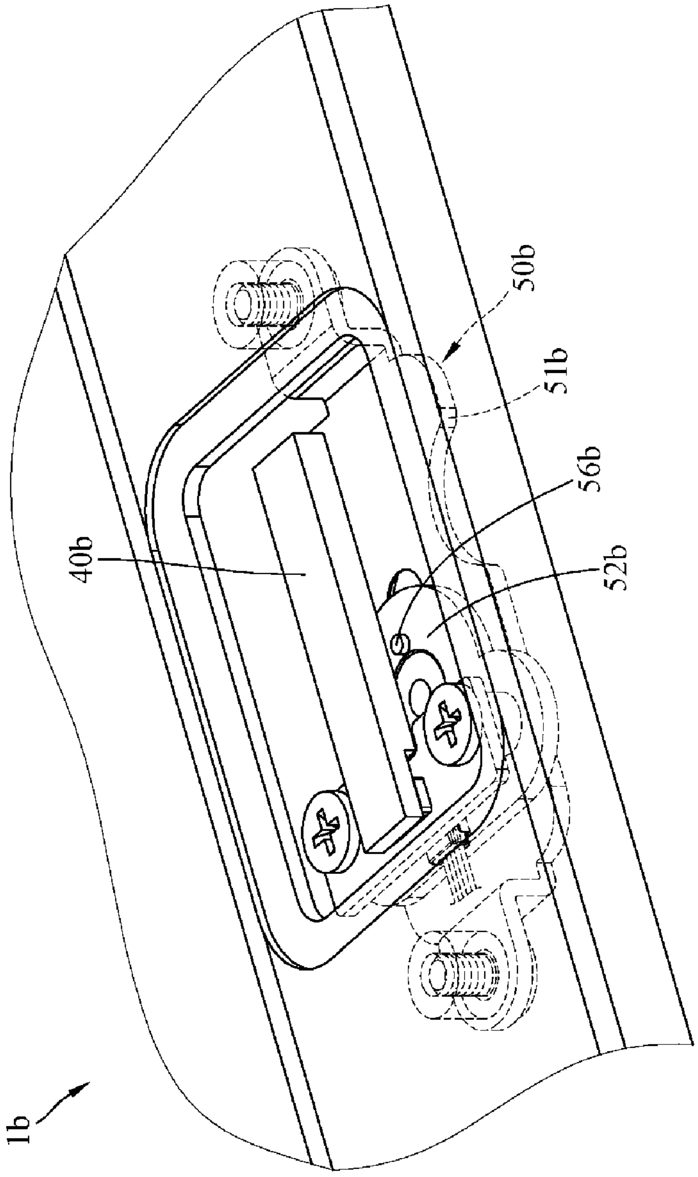
FIG. 7 is a partial three-dimensional schematic diagram of an electronic device disclosed according to a third embodiment of the present invention.
Figure 8:
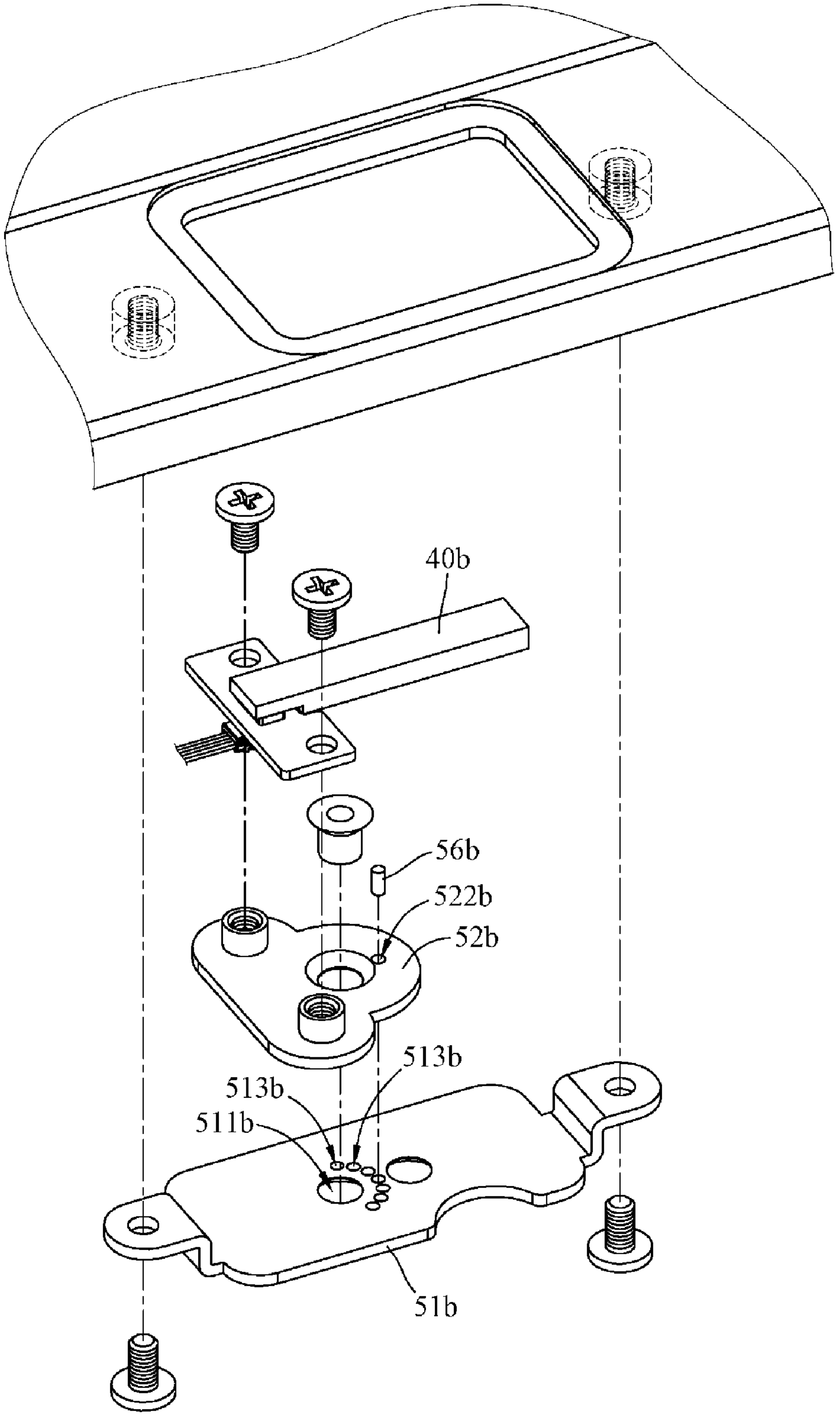
FIG. 8 is an exploded partial schematic diagram of FIG. 7.

Next, refer to FIG. 7 and FIG. 8. FIG. 7 shows a partial three-dimensional schematic diagram of an electronic device disclosed according to a third embodiment of the present invention. FIG. 8 shows an exploded partial schematic diagram of FIG. 7.

In this embodiment, an electronic device 1*b* is similar to the electronic device 1 in FIG. 1. Only differences between the two are described below, and details of the same or similar parts are omitted herein.

In this embodiment, a pivotable assembly 50*b* further includes a fixing member 56*b*, which is, for example, a pin. Further, a rotating member 52*b* further has a through hole 522*b*, and an assembly member 51*b* has a plurality of insertion holes 513*b*. The insertion holes 513*b* of the assembly member 51*b* are arranged along an arc regarding a first pivotal hole 511*b* as a center. After the angle of a third antenna assembly 40*b* has been adjusted, the fixing member 56*b* can be passed through the through hole 522*b* of the rotating member 52*b* and inserted into one of the insertion holes 513*b* of the assembly member 51*b*, so as to maintain the angle of the third antenna assembly 40*b*. However, as long as the angle of the third antenna assembly 40*b* can be maintained, the fixing member 56*b* is not limited to being a pin. In other embodiments, the fixing member 56*b* can be a screw, and the insertion holes of the assembly member are screw holes.

In the present invention, given that the third antenna assembly can be rotatable relative to the host, the third antenna assembly is not limited to being pivotally rotatable relative to the host by means of the pivotable assembly. In other embodiment, the third antenna assembly can be directly pivotally disposed at the host, or be pivotally rotatable relative to the host by means of other types of pivotable assemblies.

Moreover, these antenna assemblies are not limited to being disposed on the upper cover of the host. In other embodiments, these antenna assemblies can be disposed on a lower cover of the host, or on a housing of the display. Further, these antenna assemblies are not limited to being disposed on side edges of the host or the display. In other embodiments, these antenna assemblies can be disposed on any parts of the host or the display according to actual requirements.

According to the electronic device and the pivotable assembly disclosed by the embodiments above, an angle of a main signal transmission/reception surface of the antenna assembly is adjustable by means of the antenna assembly rotatable relative to the casing, so that it is ensured that no element blocking signals is present on the main signal transmission/reception surface of the antenna assembly, thus maintaining signal transmission/reception performance of the antenna assembly.

While the invention has been described by way of example and in terms of the preferred embodiments, it is to be understood that the invention is not limited thereto. Modifications and similar arrangements can be made by a person skilled in the art without departing from the spirit and scope of the present invention. Therefore, the scope of the claims of the present invention should be accorded with the appended claims of the present invention.

What is claimed is:

1. A pivotable assembly, for mounting an antenna assembly, comprising:

an assembly member;

a rotating member pivotally disposed at the assembly member, the rotating member being rotatable along an axis of rotation relative to the assembly member;

an antenna mounting plate disposed at the rotating member, the antenna mounting plate having a mounting surface back facing the rotating member, and the mounting surface being for mounting the antenna assembly; and a pivotal member;

wherein the assembly member has a plurality of first pivotal holes, the rotating member has a second pivotal hole, the plurality of first pivotal holes are kept at different distances from one of sides of the assembly member, the rotating member is rotatable by different axes of rotation relative to the assembly member by means of being selectively pivotally connected to different first pivotal holes of the plurality of first pivotal holes, and the pivotal member passes through the second pivotal hole of the rotating member and one of the plurality of first pivotal holes of the assembly member;

wherein the axis of rotation is parallel to a normal line of the mounting surface of the antenna mounting plate, and the rotating member is disposed between the antenna mounting plate and the assembly member; and wherein the assembly member comprises a first flange and a second flange disposed at opposite ends of the assembly member, a surface of the assembly member extends between the first flange and the second flange and is recessed relative to an upper surface of the first flange and an upper surface of the second flange facing the antenna assembly, and the rotating member is disposed on the surface of the assembly member extending between the first flange and the second flange such that an upper surface of the rotating member facing the antenna assembly is vertically below the upper surface of the first flange and the upper surface of the second flange.

2. The pivotable assembly according to claim 1, wherein the antenna mounting plate comprises a power connector, and the power connector is for electrically connecting to the antenna assembly.

3. The pivotable assembly according to claim 2, wherein the power connector is disposed on a surface of the antenna mounting plate opposite the mounting surface.

4. The pivotable assembly according to claim 1, further comprising a heat dissipating member; wherein the assembly member and the rotating member are of a heat conductive material, and the heat dissipating member is stacked on the rotating member and is disposed between the antenna assembly and the rotating member.

5. The pivotable assembly according to claim 1, wherein the antenna mounting plate is fixedly coupled to the rotating member such that the antenna mounting plate does not rotate relative to the rotating member.

6. The pivotable assembly according to claim 1, further comprising a fixing member; wherein the rotating member is fixed at the assembly member by means of the fixing member, and the fixing member passes through the rotating member and through one of a plurality of insertion holes of the assembly member circumferentially arranged about at least one of the plurality of the at least one first pivotal holes.

7. The pivotable assembly according to claim 1, wherein the rotating member comprises a plurality of protrusions extending from the upper surface of the rotating member to suspend the antenna mounting plate over the upper surface of the rotating member.

8. The pivotable assembly according to claim 7, wherein the plurality of protrusions comprise threads, and the antenna mounting plate is connected to the rotating member by the plurality of protrusions.

* * * * *